US009763397B2

(12) United States Patent
Vidal Quevedo et al.

(10) Patent No.: US 9,763,397 B2
(45) Date of Patent: Sep. 19, 2017

(54) SYSTEM AND METHOD FOR MONITORING AND CONTROLLING IRRIGATION DELIVERY IN LEACHING PILES

(71) Applicant: Aplik S.A., Vina del Mar (CL)

(72) Inventors: Guillermo Ricardo Vidal Quevedo, Valparaiso (CL); Jaime Ramirez Mancilla, Vina del Mar (CL); Andres Alfonso Alvarado Cordero, Quilpue (CL)

(73) Assignee: APLIK S.A., Vina Del Mar (CL)

( * ) Notice: Subject to any disclaimer, the term of this patent is extended or adjusted under 35 U.S.C. 154(b) by 557 days.

(21) Appl. No.: 14/387,277

(22) PCT Filed: Mar. 22, 2013

(86) PCT No.: PCT/IB2013/052294
§ 371 (c)(1),
(2) Date: Sep. 23, 2014

(87) PCT Pub. No.: WO2013/140379
PCT Pub. Date: Sep. 26, 2013

(65) Prior Publication Data
US 2015/0045972 A1    Feb. 12, 2015

(30) Foreign Application Priority Data

Mar. 23, 2012  (CL) ..................... 728-2012

(51) Int. Cl.
*G05B 1/01*     (2006.01)
*A01G 25/16*    (2006.01)
*G05B 15/02*    (2006.01)

(52) U.S. Cl.
CPC ............. *A01G 25/167* (2013.01); *G05B 1/01* (2013.01); *G05B 15/02* (2013.01); *G05B 2219/2625* (2013.01)

(58) Field of Classification Search
None
See application file for complete search history.

(56) References Cited

U.S. PATENT DOCUMENTS 9,234,980 B2 * 1/2016 Mathieu ................. E21B 43/28
2005/0211019 A1 * 9/2005 Crundwell ................ C22B 3/04
75/375

(Continued)

FOREIGN PATENT DOCUMENTS

CL    WO 2009146571 A2 * 12/2009 ............... C22B 3/02
WO   WO2009/146571 A2    12/2009

OTHER PUBLICATIONS

Fierro et al., "Use of infrared thermography for the evaluation of heat losses during coal storagl", 1999, pp. 213-228.*

(Continued)

*Primary Examiner* — Isaac T Tecklu
(74) *Attorney, Agent, or Firm* — Lucas & Mercanti, LLP (57) ABSTRACT

The invention relates to a system and method for monitoring and controlling irrigation faults in leaching piles, comprising: a thermographic vision system and a visible spectrum vision system which capture images on areas of the leaching piles; an orientation system which selectively directs the capture lens of the thermographic vision and visible spectrum systems; a meteorological system which measures meteorological variables close to the leaching pile; a processing system which interacts with the thermographic vision and visible spectrum systems and with the meteorological system, processing information and, from the captured images, identifying the levels of moisture in predetermined areas; and a user interface which displays the information processed by the processing system and allows the user to control variables of the thermographic vision and visible spectrum systems and of the orientation system.

17 Claims, 4 Drawing Sheets

(56) References Cited

U.S. PATENT DOCUMENTS

| | | | | |
|---|---|---|---|---|
| 2007/0090989 A1* | 4/2007 | Weil | ............ | G01S 13/89 |
| | | | | 342/22 |
| 2012/0297928 A1* | 11/2012 | Lang | ............ | C22B 3/02 |
| | | | | 75/386 |
| 2014/0291499 A1* | 10/2014 | Mathieu | ............ | E21B 43/28 |
| | | | | 250/254 |

OTHER PUBLICATIONS

Aplik S.A.; Sistema de vision artificial para el monitoreo continuo de pilas de lixiviacion; Apr. 2010; pp. 1-7.
O. Carpentier, et al; The use of infrared thermographic and GPS topographic surveys . . . ; Applied Thermal Engineering; vol. 25; 2005; pp. 2677-2686.
J. Garcia-Guinea, et al; Determination of iron sulphides in roofing slates from the . . . , Materiales de construccion; vol. 52; No. 266; 2002; pp. 55-63.
International Search Report dated Sep. 17, 2013.

* cited by examiner

SYSTEM AND METHOD FOR MONITORING AND CONTROLLING IRRIGATION DELIVERY IN LEACHING PILES

CROSS REFERENCE TO RELATED APPLICATION

This Application is a 371 of PCT/IB2013/052294 filed on Mar. 22, 2013 which, in turn, claimed the priority of Chilean Patent Application No. 728-2012 filed on Mar. 23, 2012 both applications are incorporated herein by reference.

FIELD OF THE INVENTION

The present invention relates to the mining industry and efficient irrigation of heap leach. In particular, the present invention is a system and method for monitoring and controlling the irrigation distribution of heap leach.

BACKGROUND OF THE INVENTION

Leach pads in mining operations are designed to allow the flow of aqueous solutions through the ore body, interacting with the mineral and could be intercepted as a solution rich in the base of the stack. However, in the current state of the art, the distribution efficiency of irrigation of the aqueous solvent is not optimal, which causes considerable quantities of mineral there not being irrigated.

Dry areas in a heap leach do not contribute to the recovery of mineral; therefore, the not irrigated area is a loss of efficiency of the leach. Furthermore, an area with high humidity or saturated, although enables the mineral watering after excess acid solution consumed and evaporates, the area covered by the pool is sealed and does not absorb more solution, stopping the dissolution process in that area.

Thus, increase recovery and productivity in the leach pad is a vital goal for the mining. However, a major limitation is the variability in the watering process, which depends on several parameters, among which are:

Size of the area without watering and,
Size of puddles of water area or saturated zone
Volume of irrigation, according to the material,
Irrigation temperature,
Failures in irrigation systems.

Currently, monitoring and control tasks on heap leach are made by human inspectors, because some of these parameters can be assessed by direct observation of the surface of heap leach. However, in these cases different value drawbacks are identified:

The surface of heap leach is partially measured.
There is a risk related to the physical safety of people who must stay a long time on the heap, in an acidic environment.
There is considerable delay in the detection and quantification of faults.

In this way, the influence of aqueous solvent distribution corresponds to one of the key points for a good recovery of ore. For this reason, it is important to have a system of continued monitoring of the heap, to assist in decision making and help in optimizing the use of resources.

An example of monitoring systems on heap leach is described in the document "Managing Gold Heap Leach in Minera Yanacocha SRL", which describes the implementation of a geophysical study on the surface of a heap. For that study, electrodes are installed along the area being studied. Then, an electric current is applied, which entering the ground and is detected by a sensor that, using a software, makes a map in two or three dimensions with colorations ranging from purple to red. The purple corresponds to the area in which a higher current flow has been detected and, therefore, has higher moisture; while red color indicates that it a low conductivity has been detected and, therefore, there is low humidity. Thus, from the above mentioned geophysical study, areas with poor irrigation can be detected, and thus a plan and measures to improve irrigation in heap leach can be implemented.

Another way of mineral monitoring is described in the paper "Use of infrared thermography for the evaluation of heat Losses During coal storage", which discloses a method for determining the total loss coefficient as heat, during coal storage, due a spontaneous self-combustion of the same. The said document discloses the use of infrared thermography, for measuring temperature and behavior of spontaneous combustion in coal stockpiles, through infrared thermal imagers.

Thus, although methodologies which allow to measure inefficient irrigation areas in heap leach can be found in the state of the art, none of the current methods provides a system to take instant actions to improve irrigation in deficient areas, with systems through real-time monitoring and direct control over the irrigation system in order to improve the homogeneity of the same.

Accordingly, it can be noted according to the state of the art, the need for a system and method for monitoring and control heap leach, which allow identifying critical areas, either deficient irrigation or saturated zones so to control the irrigation system to improve the homogeneity of the same.

To overcome the presented drawbacks, a system and method for monitoring and control is proposed, which allows identifying and controlling failures in irrigation of heap leach, such as: puddles of water or saturated areas, dry areas, leaks and lack of uniformity in irrigation of the leach pads. Said system comprises a thermographic vision system and a vision in the visible spectrum system, which are controlled by a guidance system, wherein said thermographic vision and in the visible spectrum systems send information to a processing system, which receives and processes this information to then be displayed on a user interface. The monitoring and control system further comprises a weather system that measures real-time meteorological variables and sends them to the processing system, so that these variables are considered in the processing of information, and further comprising a cleaning system.

In this way, the system can determine, in real time and automatically, the quality and distribution of irrigation of at least one heap leach, subdividing it through modules, and generating a map with the quality of irrigation for all leach modules. The system allows:

Measuring quality day and night and the proper distribution of irrigation heaps for each of the leach modules through the soil moisture measurement, estimated by changing their color and temperature characteristics.
Generating a map which indicates the quality of irrigation for all leach modules.
Establishing an automatic alarm that notifies critical conditions such as: broken hoses in leach modules, excessive or insufficient watering solution on the surface.
Establishing historical of quality trend of irrigation for the heap.
Influencing indirectly in reducing the number of landslides, minimizing losses of the solution and reducing the number of accidents related to people in charge of operating the heap.

Manipulating actuators that enable you to automatically control the distribution of irrigation in critical areas.

Furthermore, the predictive method assesses the ability of the leaching process and its control limits or thresholds, establishing the measurement scale for each of the variables or deficiencies identified.

DETAILED DESCRIPTION OF THE INVENTION

As indicated above, and as can be seen in the accompanying figures, the present invention is a system for monitoring and controlling (100) the failures in the irrigation of heap leach, such as puddles of water (saturated zone), dry areas, leaks and lack of homogeneity in at least one heap leach. Said system comprises:
- a thermographic vision system (110) and a vision system of visible spectrum (120) that capture images over areas of heap leach;
- a guidance system (130) that selectively targets the goal of capture of thermographic vision and visible spectrum systems;
- a processing system (150), interacting with thermographic vision and visible spectrum systems, processing information, identifying, quantifying and classifying based on the captured images, the surfaces according to moisture levels, dry areas, moisture areas and saturated areas; and
- a user interface (200) that displays information processed by the processing system and allows the user to control variables of thermographic vision systems and visible spectrum systems, and the guidance system, thus allowing the control over the process for irrigation in heap leach.

Figure 2:
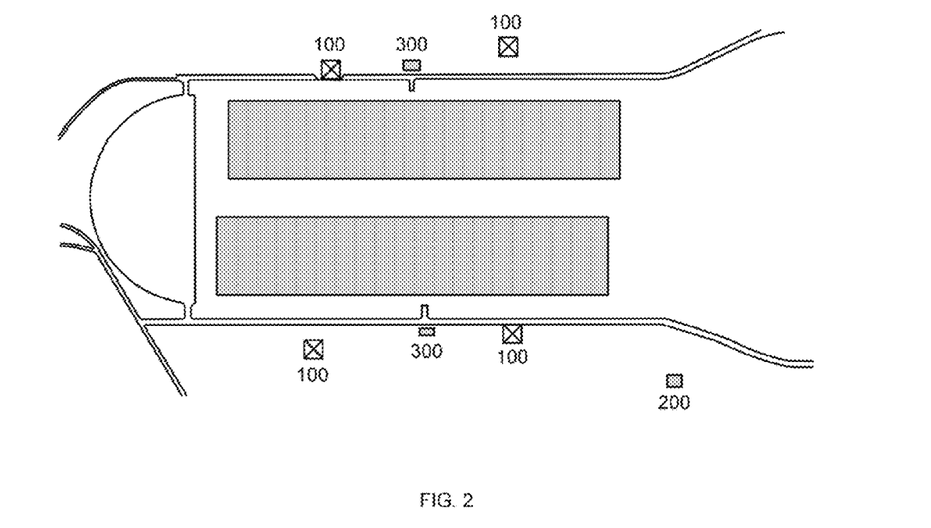
FIG. 2 illustrates a plan view of the monitoring and control system of FIG. 1.
Figure 3:
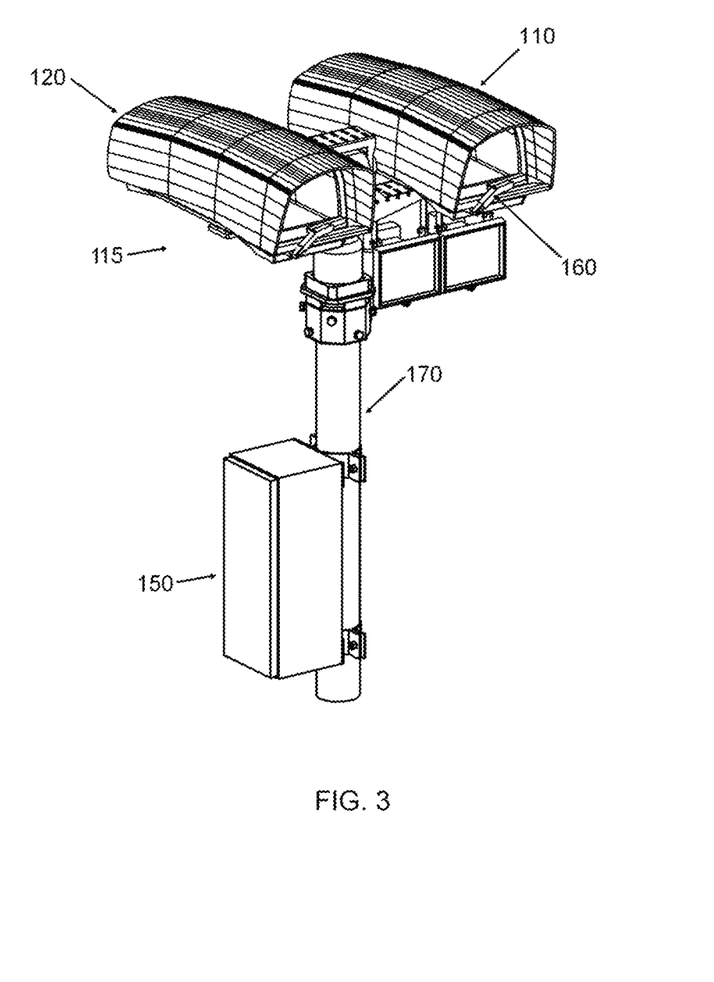
FIG. 3 illustrates a unit of thermographic vision and visible spectrum systems.

As can be appreciated in FIGS. 2 and 3, thermographic vision systems and visible spectrum systems comprise a plurality of cameras (115), strategically mounted on towers (170) around the heap leach.

Figure 1:
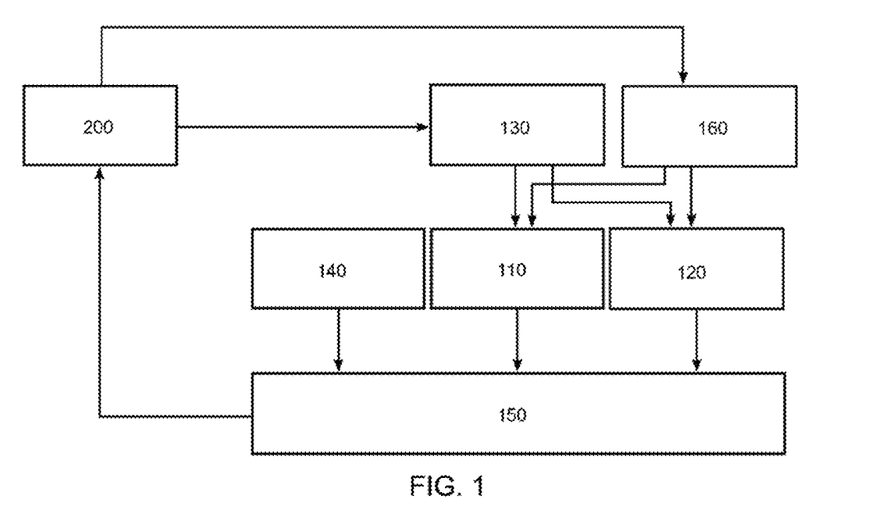
FIG. 1 illustrates a scheme of the monitoring and control system and each of its components.

The thermographic vision system (110) allows measuring the temperature of the surface of the heap leach in real time. Preferably, said thermographic vision system comprises a plurality of infrared radiation sensitive cameras (8 to 25 [μm]) called LWIR (Long Wave InfraRed).

The vision system of the visible spectrum (120) operates in the visible range and allows the detection of saturated zones, since it is capable of detecting texture. Preferably, said vision system of visible spectrum, comprises a plurality of cameras of EMCCD technology (Electron Multiplying Charge Coupled Device), which operate in a range of about 400 to 700 [nm], and are highly sensitive and can take a picture with low light conditions (0.0005 [lux]). Thus, EMCCD cameras have the following advantages:

The user interface (200) of the invention, allows informing, observing and monitoring irrigation failures.

Furthermore, the guidance system (130) operates through servo-actuators, which are used to guide with high accuracy the objective of the capture of the cameras to the heap leach to be monitored. This system can be commanded manually (by an operator) or automatically (for example by performing a predetermined trajectory).

A preferred application of the present invention, considers a weather system (140) that measures weather variables in the vicinity of the heap leach, and interacts with the processing system to complement the information from the thermographic vision (110) and visible spectrum systems (120). The weather system (140) consists of sensors mounted on at least one tower (170) to the same height of the surface of the heap, which measure weather variables which are of importance to physical-mathematical models among which are: soil temperature, air temperature, wind speed, wind direction, solar radiation, and relative humidity.

In a preferred embodiment, the present invention further comprises a cleaning system (160), whose function is to maximize the availability of thermographic vision (110) and the visible spectrum systems, which includes computers to automatically clean the dust of the glasses of the camera housings. This considered a water pumping station and two pens industrial cleaning glasses each camera housing. Said cleaning system (160) is directly operated by the user through the user interface (200). The pump station is arranged in the base of each tower (170). Thus, preferably the pumping station comprises a tank with capacity for 40 liters of water, which allows cleaning each chamber for approximately 6 to 8 weeks without the need to replenish the water level.

Additionally, the thermographic vision (110) and the visible spectrum (120) systems comprise a system of control and power supply, which consists of a board with all the electrical power supply systems, of control and communication of the various components of the system, and which is located in an electrical room (300) and the tower (170).

The processing system enables the realization of a continuous record in databases of measurements made by the meteorological system (140), of thermographic vision (110) and vision of the visible spectrum (120).

Furthermore, the processing system comprises processors which receive the camera images through a data communication system. These processors allow the following operations:
- To determine the quality and distribution of irrigation through the temporal evolution of the characteristics and temperature of irrigated areas, subdividing the heap leach into modules or in other surface of interest.
- To generate a database with all the information captured and processed, which enables to be displayed by the user interface (200) system.
- To operate the cameras, either manually or automatically, allowing the operator to direct the camera to critical areas and more rigorously review each area.
- To control the actuators that allows manipulating the irrigation on critical areas in situ.

Thus, as mentioned, the data communication system allows sending the data captured by the cameras to the processing system and control the systems from an operating station where the user interface (200) is located. Preferably, said communication system comprises a wireless or fiber optic system.

Thus, the processing system enables to display the obtained data on the user interface (200), displaying a map of the distribution and quality of irrigation of each leach module. Preferably, the quality of irrigation is shown in form of levels of severity in different colors. The operator can select a specific leach module through the user interface (200) and see in detail the quality of irrigation in that module. Also, all data of temperature, radiation and wind speed are incorporated into the processing to provide important information to users.

Among the information obtained by the system, there are:
Temperature, humidity, percent of puddle of water surface (saturated area), percent of surface of dry area presented by heap and module.
Historical graphics of data and statistical measurements.
Statistics data about times and dates.

With regard to thermographic measurement, the thermographic vision system (110) measures the temperature on the surface of the heap leach for the different modules, while the processing system elaborates a temperature map for the various modules of the heap surface with which is possible to differentiate areas, depending on the degree of moisture present.

The measurement of the thermographic vision system (110) depends on the height of the tower (170), from the distance to the farthest point of the heap and the field of vision of the lens.

Figure 4:
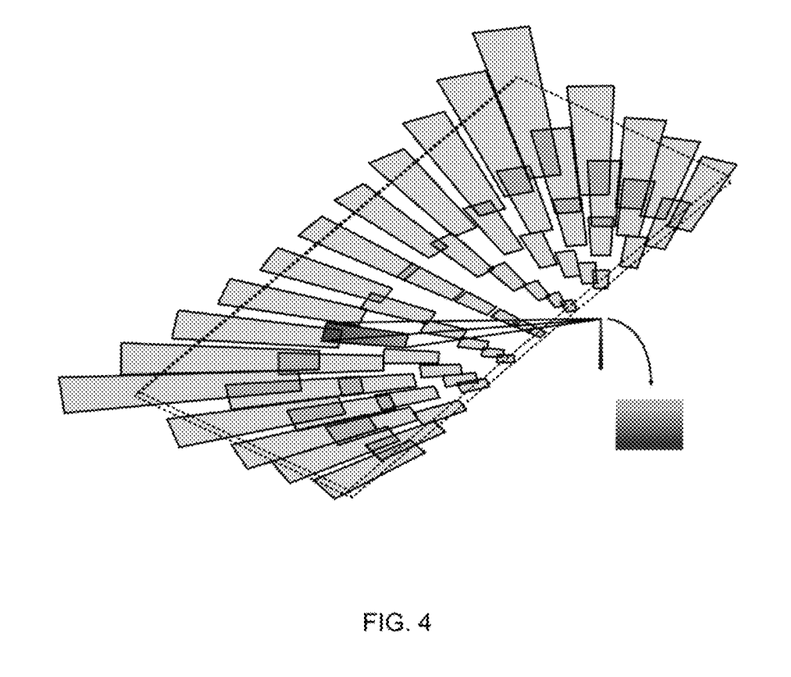
FIG. 4 illustrates the pattern of field of vision captured by the thermographic vision system.

FIG. 4 shows the patterns of field of vision captured by the thermographic camera. It can be noted that the field of vision is distorted by the geometry, with a greater distortion at greater distances. The distortion that is illustrated in FIG. 4 is corrected by the processing system and, finally, a map is obtained with no distortion of the surface temperature of the heap leach observed by the system.

Similarly, with respect to the measurement in the visible spectrum, this measurement corresponds to image capturing in the visible spectrum; wherein, preferably, the resolution for an observation tower is of nearly 76 mm at a maximum distance of 400 meters from the base of the said tower. Thus, the system considers the following instruments:
1. Cameras with EMCCD technology, which allows to capture images at low light conditions (0.0005 [lux]).
2. A motorized zoom lens of 15 to 500 [mm], which allows to carry out the zoom which ensures the above described resolution.

Figure 5:
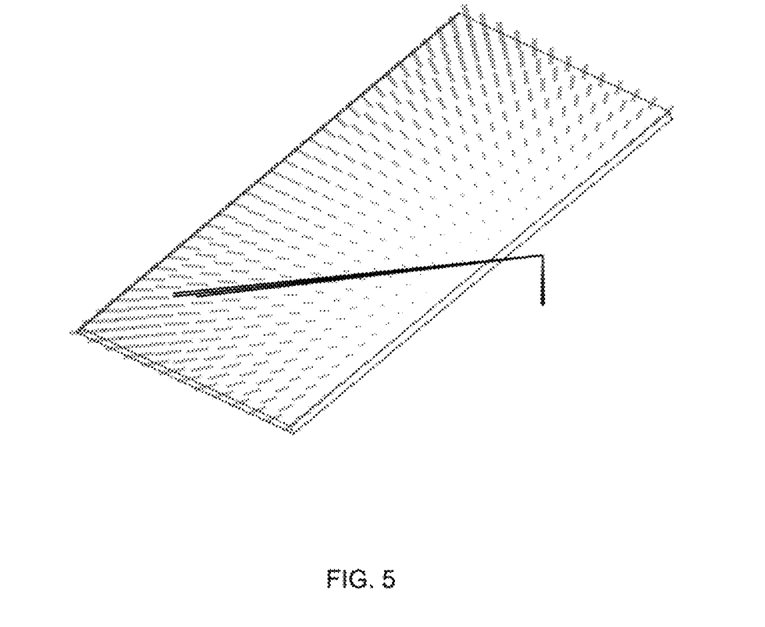
FIG. 5 illustrates the pattern of field of vision captured by the system of the visible spectrum vision.

FIG. 5 shows the patterns of the field of vision, captured by the vision system of the visible spectrum (120) with the lens set to 500 [mm]. It can be seen that the field of vision is distorted by the geometry, as in the case of the thermographic camera, but having a smaller field of vision, a high resolution in all observed points can be accomplished. The distortion shown in the figure above is corrected by the information and processing system and, finally, a map without distortion of the surface texture observed in the heap leach is obtained by the system.

The present invention further comprises a predictive method for quantitatively assessing the irrigation failure of at least one heap leach, comprising the steps of:
a) having a thermographic vision system (110) and a vision system of visible spectrum (120), which observe a plurality of modules or variables areas of the heap leach to capture images through the following steps:
capturing thermographic and visible spectrum of the module images;
quantifying the percentage of the surface of dry and watered areas, based on the temperature distributions in the module surface;
quantifying the percentage of the surface of saturated areas, based on textures in the images of visible spectrum;
b) ordering the modules according to their percentage of area for each moisture level;
c) selecting modules that are located outside the predetermined control limits;
d) evaluating the irrigation efficiency in each module and heap leach;
e) displaying information about the status of irrigation of the modules outside of the control limits, periodically, which is displayed in a user interface (200), generating a map of the state of the heap irrigation; and
a) applying control measures on modules under the control limits.

In a preferred embodiment of the present invention the identification of dry areas, irrigated areas and saturated areas is performed by complementing image capturing with meteorological information obtained from the environment of the heap leach, so to correct the information obtained from thermographic images and in the visible spectrum.

The quantification of dry areas and watered areas, based on temperature measurements at the surface of each module is performed through the temporal variance estimates for each measurement point, where each value is classified according to a threshold value.

Figure 6:
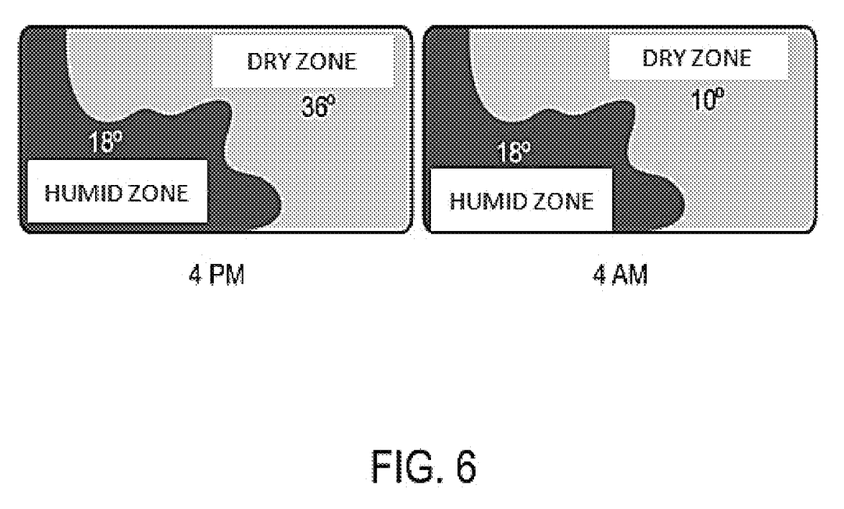
FIG. 6 shows an exemplifying diagram of a thermographic image for the hours of extreme temperature.

Thus, as is shown in FIG. 6, for example, a thermographic image of a portion of a heap leach (a module of size 255×35 [m]), for two different times (4 PM and 4:00 a.m., hours presenting extreme environmental temperatures), can be considered. From the taken data, two temperature distributions can be clearly observed, the first centered on solution temperature (18° C.), which groups all the irrigated area and a varying internal temperature between 10° C. and 36° C., which corresponds to the dry zone.

Dry areas present a significantly smaller thermal inertia, and therefore, the dry area would be composed by all points whose daily temperature variation is greater. The steps are:
Registering the temperature measurement for all points of the area under observation of the heap leach, for about 24 hours at regular intervals. The measurement is denoted as $x_{i,j}(t)$. Where (i,j) denotes the spatial position and t the time at which the measurement is made.
Calculating the temporal variance $\sigma^2_{i,j}$ of the temperature measurement through the equations:

$$\sigma^2_{i,j} = \frac{1}{N-1} \sum_{t=1}^{N} (x_{i,j}(t) - \bar{x})^2; \quad \bar{x} = \frac{1}{N} \sum_{t=1}^{N} x_{i,j}(t)$$

Application of a classification by threshold β:
If $\sigma_{i,j} > \mu$ point (i,j) belongs to the surface that is irrigated $S_{dry}$.
If $\sigma_{i,j} \leq \mu$ point (i,j) does not belong to the surface that is not irrigated $S_{humid}$.

Similarly, the measurement of the surface of saturated areas based on textures in visible spectrum images, is performed through the vision system of visible spectrum (120), based on the classification of each measurement point, according to the visible texture of the point, in such a way that each measured point is compared with a threshold value and classified in reference to the latter.

Figure 7:
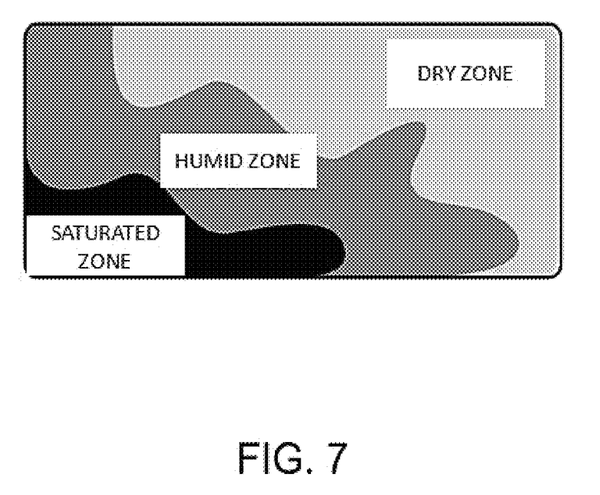
FIG. 7 illustrates a diagram of an exemplification of an image in the visible spectrum.

FIG. 7 illustrates an exemplification of a captured image for a portion of the heap leach, having a puddle of water. This schematic figure shows that a puddle of water area differs since it represents a value vi, j (based on the texture in the image of the measuring point) markedly inferior than the rest of the image; thereby, applying a thresholding method it is possible to quantify the area of the said puddle of water, denominated $S_{puddle}$ as:

Application of a classification by threshold β

If $v_{i,j} \leq \beta$ point (i,j) belongs to the surface of the puddle $S_{puddle}$.

If $v_{i,j} > \beta$ point (i,j) does not belong to the surface of the puddle.

Additionally, as previously mentioned, after the capture of thermographic and in the visible spectrum images, the data obtained are corrected in order to correct the distortion caused by the position of the cameras in the vision systems.

The evaluation of the efficiency of each module is based on the known fact that by irrigating a wider surface, the rate of recovery of ore increases. Thus, to quantify the efficiency, the following indicator is used:

$$E_f = \frac{S_{irrigated}}{\phi} = \frac{S_{total} - S_{dry}}{\phi}$$

where, $E_f$ is the efficiency of the heap.

$S_{irrigated}$ is the irrigated area of the heap, equal to the exposed surface minus the dry surface.

$S_{total}$ is the exposed surface of the heap $S_{dry}$ is the dry surface of the heap φ is the flow of leaching agent.

With this definition of efficiency, the monitoring system applies two parameters to increase the efficiency of the heap: the increase of the irrigated area and the improvement of the distribution of leaching agent.

The application of control measures preferably consists of the manipulation of a system of actuators that automatically controls the irrigation in critical areas and an alarm system of puddles.

Furthermore, the monitoring system of heap leach requires being elevated above the surface of the heap to get a better view to the farthest points. The following table shows the distortion caused by the angle of vision of the cameras, considering towers of 60 and 40 meters of height, for a stack of 7.5 meters of elevation.

| Distance to the tower [m] | Distortion Tower of 60 meters | Distortion Tower of 40 meters | Improvement in Tower of 60 meters |
| --- | --- | --- | --- |
| 100 | 1:2.2 | 1:3.2 | 40% |
| 200 | 1:3.9 | 1:6.2 | 55% |
| 300 | 1:5.8 | 1:9.3 | 59% |
| 400 | 1:7.7 | 1:12.3 | 60% |
| 500 | 1:9.6 | 1:15.4 | 60% |

Thus, for these particular configurations, considering only the distortion caused by the angle of vision, the maximum range of a 40-meter tower is 310 meters instead of 400 meters, so that the total range is reduced by almost 100 meters with a 40 meter tower. Moreover, taking into account a heap leach of 600 meters long and 250 meters wide, there is a tower of 40 meters that can analyze up to 10 modules, while a 60-meter tower can analyze up to 18 modules. Thus, to analyze the entire oxide heaps, at least six towers of 40 meters or, alternatively, four towers of 60 meters are required.

The invention claimed is:

1. A system for monitoring and controlling failures in irrigation of heap leach, comprising:
    a system of thermographic vision and a vision system of visible spectrum to capture images of areas of the heap leach;
    a guidance system that selectively directs the objective of capture of the thermographic vision and visible spectrum systems;
    a processing system that interacts with the thermographic vision and visible spectrum systems, processing information, identifying, quantifying and classifying based on the captured images, the surfaces according to moisture levels: dry areas, humid areas and saturated areas; and
    a user interface that displays information processed by the processing system and allows the user to control variables of the thermographic vision and visible spectrum systems, and of the guidance system; thus, allowing control over the process of irrigation of heap leach.

2. The monitoring and control system according to claim 1, wherein the thermographic vision and visible spectrum systems comprise a plurality of cameras, strategically placed in towers around the heap leach.

3. The monitoring and control system according to claim 1, wherein the thermographic vision system comprises a plurality of infrared radiation sensitive cameras in a range of 8 and 25 [μm].

4. The monitoring and control system according to claim 1, wherein the vision system of the visible spectrum operates in the visible range, quantifying the surface of zones saturated of excess of humidity or puddles, through the detection of textures.

5. The monitoring and control system according to claim 1, wherein the thermographic vision and processing systems allow to quantify the surface of the dry areas of the heap leach.

6. The monitoring and control system according to claim 4, wherein the vision system of visible spectrum comprises a plurality of cameras with EMCCD technology, operating in a range of about 400 to 700 [nm] and with an illumination greater than or equal to 0.0005 [lux].

7. The monitoring and control system according to claim 1, wherein the user interface allows to inform, observe and monitor the irrigation failures.

8. The monitoring and control system according to claim 2, wherein the guidance system operates through servo-actuators that direct the objective of the capture of the cameras to the area of the heap to be monitored.

9. The monitoring and control system according to claim 1, wherein said system further comprises a weather system that measures weather variables in the vicinity of the heap leach, which interacts with the processing system so the already mentioned variables are considered in the processing of information, wherein it comprises a plurality of sensors located at least in one tower to a similar height of the surface of the heap.

10. The monitoring and control system according to claim 2, wherein said system further comprises a cleaning system that maximizes the availability of thermographic vision and visible spectrum systems, and which consists of a water pumping station and two industrial nibs that clean the glasses of each housing chamber.

11. The monitoring and control system according to claim 1, wherein the thermographic vision and visible spectrum systems comprise a feed, communication and control system.

12. A method for quantitatively assessing the irrigation failures of at least one heap leach, comprising the following steps:
  a) having a system of thermographic vision and a vision system of visible spectrum, which observe a plurality of modules or variables areas of heap leach for the capture of images, through the following steps:
     capturing thermographic and in visible spectrum images of the module;
     quantifying the percentage of surface of dry areas and irrigated areas based on temperature distributions in the module surface;
     quantifying the surface percentage of saturated areas, based on textures in the images of the visible spectrum;
  b) ordering the modules according to their percentage of area for each moisture level;
  c) selecting modules that are located outside the predetermined control limits;
  d) evaluating the irrigation efficiency in each module and in the heap leach;
  e) displaying periodically information about the irrigation status of the modules outside the control limits, which is displayed in a user interface and generates a map of the state of the heap leach; and
  f) implementing control measures on modules under the control limits.

13. The method according to claim 12, wherein the quantification of dry areas, irrigated areas and saturated areas is performed by complementing the capture of images with weather information, obtained from the environment of the heap leach, so to correct the information obtained from the thermographic and in visible spectrum images.

14. The method according to claim 12, wherein the identification of dry areas is performed through estimates of the temporal variance of the temperature for each measurement point, where each value is classified according to a threshold value.

15. The method according to claim 12, wherein the identification of saturated areas is performed based on the classification of each measuring point according to the visible texture of the point, wherein each measured point is compared with a threshold value and classified in reference to the latter.

16. The method according to claim 12, wherein after the capture of thermographic and in visible spectrum images, the obtained data are corrected in order to correct the distortion caused by the position of the camera of the vision systems.

17. The method according to claim 12, wherein implementation of control measures, involving the manipulation of an actuator system that automatically controls the irrigation in critical areas and an alarm system that alerts the presence of puddles of water or saturated areas.

* * * * *